United States Patent [19]

Tanaka et al.

[11] 4,215,539
[45] Aug. 5, 1980

[54] EXHAUST GAS PURIFYING APPARATUS FOR AUTOMOBILE MULTI-CYLINDER ENGINE

[75] Inventors: Kazuyuki Tanaka; Tatsuro Oda, both of Hiroshima, Japan

[73] Assignee: Toyo Kogyo Co., Ltd., Hiroshima, Japan

[21] Appl. No.: 891,111

[22] Filed: Mar. 28, 1978

[30] Foreign Application Priority Data

Apr. 11, 1977 [JP] Japan ................... 52/41635

[51] Int. Cl.$^2$ .................. F01N 3/15; F02M 25/06
[52] U.S. Cl. .................... 60/278; 60/293; 60/301
[58] Field of Search ............... 60/278, 293, 301

[56] References Cited

U.S. PATENT DOCUMENTS

| | | | |
|---|---|---|---|
| 3,662,541 | 5/1972 | Sawada | 60/293 |
| 3,767,764 | 10/1973 | Delbear | 60/301 |
| 3,824,788 | 7/1974 | Cole | 60/301 |
| 3,984,975 | 10/1976 | Price | 60/301 |
| 4,024,708 | 5/1977 | Takemoto | 60/278 |
| 4,056,933 | 11/1977 | Nohira | 60/278 |
| 4,069,666 | 1/1978 | Nakamura | 60/278 |

*Primary Examiner*—Douglas Hart
*Attorney, Agent, or Firm*—Wenderoth, Lind & Ponack

[57] ABSTRACT

For use in an automobile multi-cylinder engine having exhaust port ducts leading from engine cylinders and through which exhaust gases are emitted subsequent to combustion of air-fuel mixture, an exhaust gas purifying apparatus which has a reducing catalyst unit and an oxidizing catalyst unit disposed in a main exhaust manifold connected on one hand to a first group of the exhaust port ducts and on the other hand to the atmosphere, and an auxiliary exhaust manifold connected on one hand to a second group of the exhaust port ducts and on the other hand to a portion of the main exhaust manifold at a position downstream of the reducing catalyst unit and upstream of the oxidizing catalyst unit. The apparatus further has a pressure operated valve disposed in a secondary air supply passage for introducing secondary air into the auxiliary exhaust manifold by the utilization of a pulsating flow of the exhaust gases through the auxiliary exhaust manifold.

7 Claims, 4 Drawing Figures

EXHAUST GAS PURIFYING APPARATUS FOR AUTOMOBILE MULTI-CYLINDER ENGINE

BACKGROUND OF THE INVENTION

The present invention generally relates to an exhaust gas purification and, more particularly, to an exhaust gas purifying apparatus for an automotive vehicle engine of a type having a plurality of engine cylinders.

U.S. Pat. No. 3,908,371, patented on Sept. 30, 1975, discloses an exhaust gas purifying apparatus for an automotive vehicle, which utilizes a dual-catalyst exhaust treatment system including a reducing catalyst for removing an excess of oxygen and reducing nitrogen oxides in the exhaust gases and an oxidizing catalyst for oxidizing carbon monoxide and hydrocarbons in the exhaust gases. More specifically, according to the above mentioned U.S. patent, a plurality of exhaust ducts respectively leading from exhaust outlets of the corresponding engine cylinders are merged into a single exhaust manifold having reducing and oxidizing catalyst units disposed therein so that the exhaust gases emitted from the engine cylinders subsequent to combustion of an air-fuel mixture within such engine cylinders can, after having been joined together, pass through the reducing catalyst unit and then through the oxidizing catalyst unit prior to such exhaust gases being discharged to the atmosphere. In order to enhance oxidization of carbon monoxide and hydrocarbons in the exhaust gases which have passed through the reducing catalyst unit, the purifying apparatus of the above mentioned United States patent further comprises a secondary air supply means including an engine operated pump for introducing secondary air into a portion of the exhaust manifold between the reducing catalyst unit and the oxidizing catalyst unit.

In the prior art dual-catalyst purifying apparatus having the construction described above, the engine operated pump for introducing the secondary air into the manifold portion between the reducing and oxidizing catalyst units is essential. The reason for this is obviously rooted in the fact that all of the exhaust ducts respectively leading from the individual engine cylinders are merged into the single exhaust manifold at a position upstream of the reducing catalyst unit in terms of the direction of flow of the exhaust gases towards the atmosphere. More specifically, as is well known to those skilled in the art, automobile exhaust gases successively emitted from the engine cylinders generally flow through an exhaust manifold towards the atmosphere in a substantially pulsating manner with the pressure inside the exhaust manifold alternately increasing and decreasing, because of the different times of firing of air-fuel mixtures supplied into the respective engine cylinders.

While this is well known to those skilled in the art, if all of the exhaust gases successively emitted from the individual engine cylinder are allowed to pass through the reducing catalyst unit such as in the prior art dual-catalyst purifying apparatus, the pulsating characteristic of flow of the exhaust gases through the exhaust manifold downstream of the reducing catalyst unit is so weakened that the prior art dual-catalyst purifying apparatus cannot make use of such pulsating characteristic in supplying the secondary air into the exhaust manifold portion downstream of the reducing catalyst unit and upstream of the oxidizing catalyst unit, and an external pumping means, such as the engine operated pump, is accordingly required.

The employment of the engine operated pump results in a substantial increase in the cost of manufacture of the purifying apparatus which in turn reflects upon the cost of manufacture of an automotive vehicle equipped with such purifying apparatus. In addition, since the engine operated pump is driven from a power output shaft of the engine, the power output shaft is unnecessarily loaded which constitutes one of the causes of reduction in the power output of the engine as a whole.

SUMMARY OF THE INVENTION

Accordingly, the present invention has been developed with a view to substantially eliminating the disadvantages and inconveniences inherent in the prior art purifying apparatus of the type described above and is intended to provide an improved dual-catalyst purifying apparatus for an automotive vehicle engine of a type having a plurality of engine cylinders, wherein the pulsating characteristic of the flow of the exhaust gases is effectively and advantageously utilized to supply secondary air into a portion of the exhaust manifold between the reducing and oxidizing catalyst units.

Another important object of the present invention is to provide an improved dual-catalyst purifying apparatus of the type referred to above which does not require the provision of such expensive and power-consuming pumping means as is employed in the prior art apparatus of a similar kind.

In accomplishing these and other objects of the present invention, a plurality of exhaust ducts respectively leading from the engine cylinders are divided into first and second groups, the exhaust ducts of the first group being connected to a main exhaust manifold having reducing and oxidizing catalyst units disposed therein while the exhaust ducts of the second group are connected to a portion of the main exhaust manifold between the reducing and oxidizing catalyst units through an auxiliary exhaust manifold. Since the concept of the present invention can equally be applicable or an automotive vehicle engine having two or more engine cylinders, the number of the exhaust ducts in each group may be one or more.

For supplying secondary air necessary to enhance oxidization of the exhaust gases during the passage of the exhaust gases through the oxidizing catalyst unit, a portion of the auxiliary exhaust manifold is connected to a source of secondary air through a pressure operated valve. In one preferred embodiment of the present invention, the pressure operated valve is constituted by a reed valve.

In the construction of the dual-catalyst purifying apparatus embodying the present invention, since there is no substantial resistance to flow of the exhaust gases in the auxiliary exhaust manifold, the exhaust gases which are successively emitted from the exhaust ducts of the second group at intervals flow through the auxiliary exhaust manifold in a pulsating manner with the pressure alternately increasing and decreasing and this pulsating flow of the exhaust gases through the auxiliary exhaust manifold can be utilized to repeatedly open and close the reed valve.

It is generally understood that, in order to enable the reducing catalyst to carry out its performance, automobile exhaust gases to be reacted in the presence of the reducing catalyst should be of a nature ready to be reduced in the presence of such reducing catalyst while, in order to enable the oxidizing catalyst to carry out its performance, the gases should be of a nature ready to be oxidized in the presence of oxygen. In view of this, in the dual-catalyst purifying apparatus embodying the present invention, the arrangement may be such that the air-fuel mixture to be introduced into some of the engine cylinders, which are connected to the exhaust ducts of the first group, can be proportioned to have an air-to-fuel ratio substantially equal to or appreciably richer than a stoichiometric air-to-fuel ratio, so that the exhaust gases subsequently emerging from the exhaust ducts of the first group into the main exhaust manifold has a tendency to be readily reduced as they pass through the reducing catalyst unit. This can be achieved by the use of, for example, at least two carburetors through which the air-fuel mixture, proportioned to a ratio substantially equal to or appreciably richer than the stoichiometric air-to-fuel ratio, and the air-fuel mixture of a ratio different from that of the first mentioned air-fuel mixture can be respectively introduced into some of the engine cylinders, connected to the exhaust ducts of the first group, and the other of the same engine cylinders connected to the exhaust ducts of the second group. As far as the exhaust gases emerging from the exhaust ducts of the second group are concerned, they may have a tendency either to be ready to be reduced in the presence of the reducing catalyst or to be ready to be oxidized in the presence of the oxidizing catalyst. Even though the exhaust gases emerging from the exhaust ducts of the second group have a tendency to be ready to be reduced in the presence of the reducing catalyst, that is, they are similar in nature to the exhaust gases emerging from the exhaust ducts of the first group, such as in the case where a single carburetor is employed and the air-fuel mixture having a ratio substantially equal to or appreciably richer than the stoichiometric air-to-fuel ratio is introduced into all of the engine cylinders, no substantial reduction in overall purification of the exhaust gases takes place because the secondary air is introduced in the manner as hereinbefore described so that a mixture of the exhaust gases passed through the reducing catalyst unit and those supplied through the auxiliary exhaust manifold can be modified to have a tendency to be ready to be oxidized as the mixture subsequently passes through the oxidizing catalyst unit.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
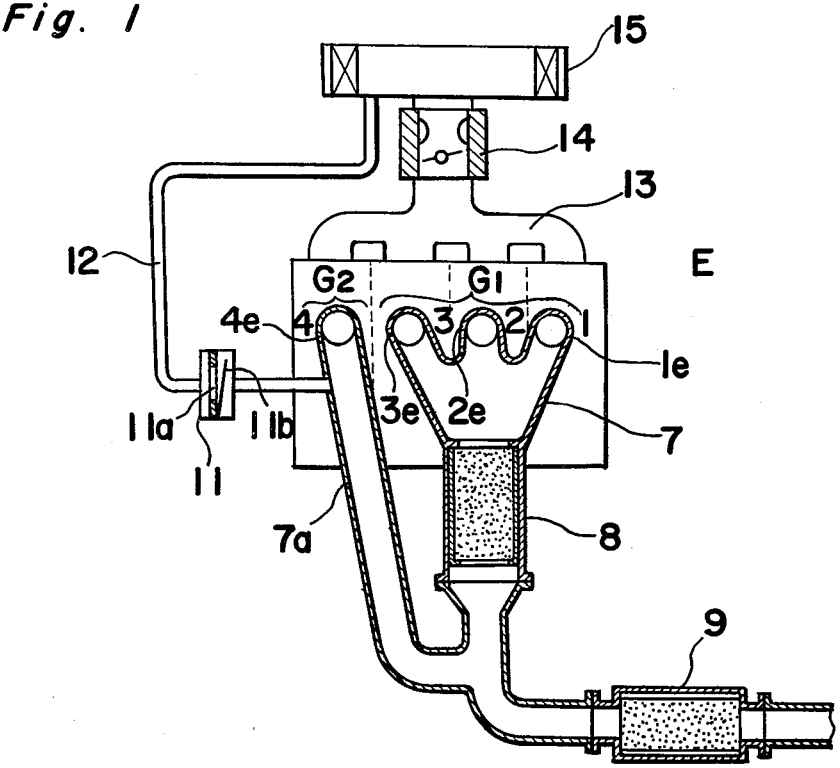
FIG. 1 is a schematic side sectional view of a four-cylinder engine according to a first preferred embodiment of the present invention.

Before the description of the present invention proceeds, it is to be noted that like parts are designated by like reference numerals throughout the accompanying drawings.

Referring first to FIG. 1, there is shown an automobile internal combustion engine E of any known construction having four engine cylinders 1, 2, 3 and 4 having respective intake ports (not shown) connected to a source of air-fuel mixture through a common intake manifold 13. As is well known to those skilled in the art, the source of the air-fuel mixture is constituted by a carburetor 14 where fresh air and a fuel are respectively supplied from the atmosphere through an air cleaner 15 and from a fuel tank (not shown) and mixed in a predetermined ratio substantially equal to or appreciably richer than the stoichiometric air-to-fuel ratio in any known manner.

The engine cylinders 1, 2, 3 and 4 also have respective exhaust ports to which associated exhaust ducts 1e, 2e, 3e and 4e are connected as shown. In accordance with the present invention, these exhaust ducts leading from the respective engine cylinders 1, 2, 3 and 4 are divided into two groups G1 and G2; the first group G1 including the exhaust ducts 1e, 2e and 3e and the second group G2 including the exhaust duct 4e.

As thus far illustrated, a single air-fuel mixture proportioned to a mixture ratio appreciably richer than the stoichiometric air-to-fuel ratio is supplied to all the individual engine cylinders 1, 2, 3 and 4 and, therefore, portions of exhaust gases subsequently exhausted from the respective engine cylinders 1, 2, 3 and 4 are similar in quality or nature to each other. This is particularly advantageous in that the engine intake system can be simplified requiring the only a single carburetor 14 as shown. However, it is preferred that the air-fuel mixture to be introduced only into the engine cylinders 1, 2 and 3 associated with the exhaust ducts 1e, 2e and 3e of the first group G1 be proportioned to such a mixture ratio that the exhaust gases subsequently emerging from the respective engine cylinders 1, 2 and 3 is of a nature ready to be reduced in the presence of a reducing catalyst while, it is preferred that the air-fuel mixture to be introduced into the engine cylinder 4 associated with the exhaust duct 4e of the second group G2 have a mixture ratio equal to or different from that of the air-fuel mixture supplied into the engine cylinders 1, 2 and 3, although this requires the use of two carburetors in the intake system.

The exhaust ducts 1e, 2e and 3e are so connected together that the exhaust gases flowing in the respective ducts 1e, 2e and 3e can admix with each other and subsequently flow into a main exhaust manifold 7 having a reducing catalyst unit 8 and an oxidizing catalyst unit 9 disposed therein, said units 8 and 9 being respectively positioned upstream and downstream with respect to the direction of flow of the exhaust gases towards the atmosphere away from the engine E. The reducing catalyst unit 8 is a three-way catalyst and/or has a capability of assisting reduction of the exhaust gases when the latter contact such reducing catalyst while the oxidizing catalyst unit is a three-way catalyst and/or has a capability of assisting oxidization of the exhaust gases when the latter contact such oxidizing catalyst.

The exhaust duct 4e of the second group G2 is connected to an auxiliary exhaust manifold 7a which may be a piping element separate from the exhaust duct 4e or an integral extension of the exhaust duct 4e. This auxiliary exhaust manifold 7a has one end connected with the exhaust duct 4e and has the other end connected to a portion of the main exhaust manifold 7 between the reducing and oxidizing catalyst units 8 and 9 and a substantially intermediate portion connected, preferably through the air cleaner 15, to the atmosphere by way of a secondary air supply passage 12 having a pressure operated valve, for example, a reed valve 11 disposed therein. The reed valve 11 is of a type having an aperture 11a and a reed member 11b adapted to open and close the aperture 11a, and is so disposed in the secondary air supply passage 12 that when a negative pressure and a positive pressure are alternately developed in the auxiliary exhaust manifold 7a during the pulsating flow of the exhaust gases therethrough, the reed member 11b is correspondingly alternately displaced to open and close the aperture 11a to allow flow of and interrupt the supply of the secondary air into the portion of the main exhaust manifold between the catalyst units 8 and 9, respectively. It is to be noted that during the time the reed member 11b is held in a position to close the aperture 11a, no exhaust gases flow into the portion of the supply passage 12 remote from the manifold 7a through the reed valve 11 because the latter serves as a sort of check valve.

In the construction as hereinbefore described, it is clear that the exhaust gases exhausted from the engine cylinders 1, 2 and 3 are collected together as they enter the main exhaust manifold 7 and then flow towards the atmosphere through the reducing catalyst unit 8 and also through the oxidizing catalyst unit 9. As hereinbefore described, as the exhaust gases flow through the reducing catalyst unit 8, nitrogen oxides contained in the exhaust gases are reduced by contact with the reducing catalyst and, as the exhaust gases are subsequently passed through the oxidizing catalyst unit 9, carbon monoxide and hydrocarbons still contained in the exhaust gases are oxidized by contact with the oxidizing catalyst. On the other hand, since there is no resistance to the flow of the exhaust gases exhausted from the engine cylinder 4e into the auxiliary exhaust manifold 7a, which resistance would otherwise be constituted by a reducing catalyst unit if the latter were disposed in the auxiliary exhaust manifold 7a, the secondary air can be sucked into the exhaust manifold 7a by the utilization of the pulsating flow of the exhaust gases in the auxiliary exhaust manifold 7a as hereinbefore described without the pulsating characteristic of flow of such exhaust gases being weakened. The exhaust gases flowing in the exhaust manifold 7a and containing the secondary air supplied thereinto through the reed valve 11 as hereinbefore described subsequently admix with the exhaust gases downstream of the reducing catalyst unit 8 and are finally passed through the oxidizing catalyst unit 9. It is to be noted that, because of the secondary air supplied in the manner as hereinbefore described, the mixture of the exhaust gases from the engine cylinders 1, 2 and 3 and that from the engine cylinder 4 is of a nature ready to be oxidized by combustion as it passes through the oxidizing catalyst unit 9. Therefore, the hydrocarbons and carbon monoxide contained in the exhaust gases as a whole can be re-burned to provide a substantially purified exhaust gas which is subsequently discharged to the atmosphere.

Figure 2:
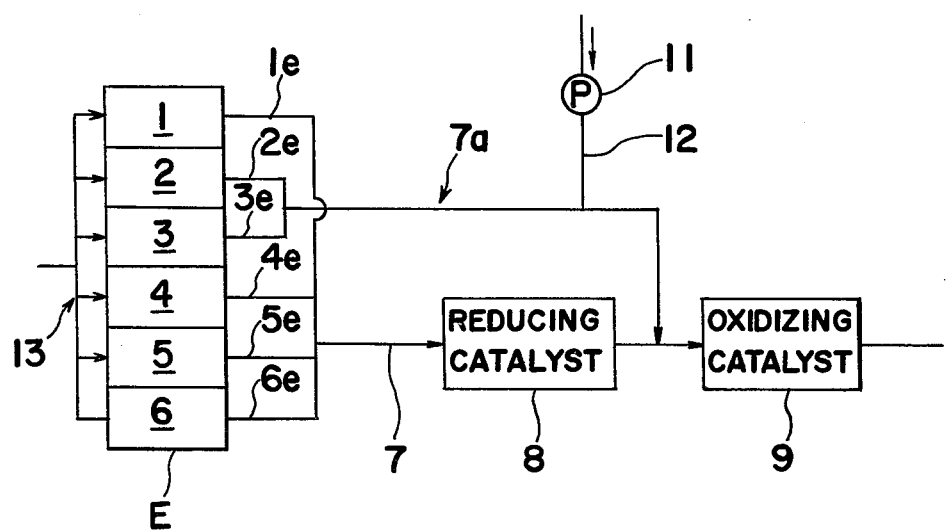
FIG. 2 is a schematic diagram showing the connection of a six-cylinder engine with a dual-catalyst purifying system according to a second preferred embodiment of the present invention.

It is to be noted that the concept of the present invention is equally applicable to a six-cylinder engine, an example of which is shown diagrammatically in FIG. 2.

Referring now to FIG. 2, there is schematically shown an automobile internal combustion engine E having six engine cylinders 1, 2, 3, 4, 5 and 6 having respective exhaust ports to which associated exhaust ducts 1e, 2e, 3e, 4e, 5e and 6e are connected. These exhaust ducts in the embodiment shown in FIG. 2 are divided into two groups; the first group including the exhaust ducts 1e, 4e, 5e and 6e and the second group including the exhaust ducts 2e and 3e. As is the case with the embodiment shown in FIG. 1, the exhaust ducts 1e, 4e, 5e and 6e of the first group are connected to the main exhaust manifold 7 and the exhaust ducts 2e and 3e of the second group are connected to the auxiliary exhaust manifold 7a. The reason for the exhaust ducts 2e and 3e being connected to the auxiliary manifold 7a is that, if the engine cylinders are numbered as shown by the reference numerals 1 to 6 from the front to the back of the engine E and the firing order in which the cylinders deliver their power strokes is 1-3-5-6-2-4, and if certain of the engine cylinders in which firing of the air-fuel mixtures does not take place in immediate sequence, but takes place at intervals of one or more of said certain engine cylinders (this is true of the firing of the engine cylinders 2e and 3e a relatively high negative pressure can be created in the auxiliary exhaust manifold 7a during the pulsating flow of the exhaust gases from said certain engine cylinders. In addition, if said certain engine cylinders are located adjacent to each other as is the case with the cylinders exhausting to exhaust ducts 2e and 3e, an additional advantage is obtained that the exhaust piping system for the exhaust ducts can be simplified.

However, the number of the exhaust ducts of the first group need not be always limited to two such as shown in FIG. 2, but may be more than two but greater than half the total number of the engine cylinders.

In the embodiment described with reference to and as shown in FIG. 1, although the exhaust gases emitted from the engine cylinder 4e are not passed through the reducing catalyst unit 8, but directly to a portion of the main exhaust manifold 7 downstream of the reducing catalyst unit 8, the amount of the exhaust gases emitted from the engine cylinder 4e is substantially only one fourth of the total amount of the exhaust gases emitted from all of the engine cylinders 1e to 4e and, accordingly, the amount of $NO_x$ contained in the exhaust gases ultimately discharged to the atmosphere can be reduced to an environmentally acceptable small value. However, if a greater reduction in the amount of $NO_x$ contained in the exhaust gases ultimately discharged to the atmosphere is desired, an exhaust gas recirculating passage may be employed such as shown at 16 in FIG. 3.

Figure 3:
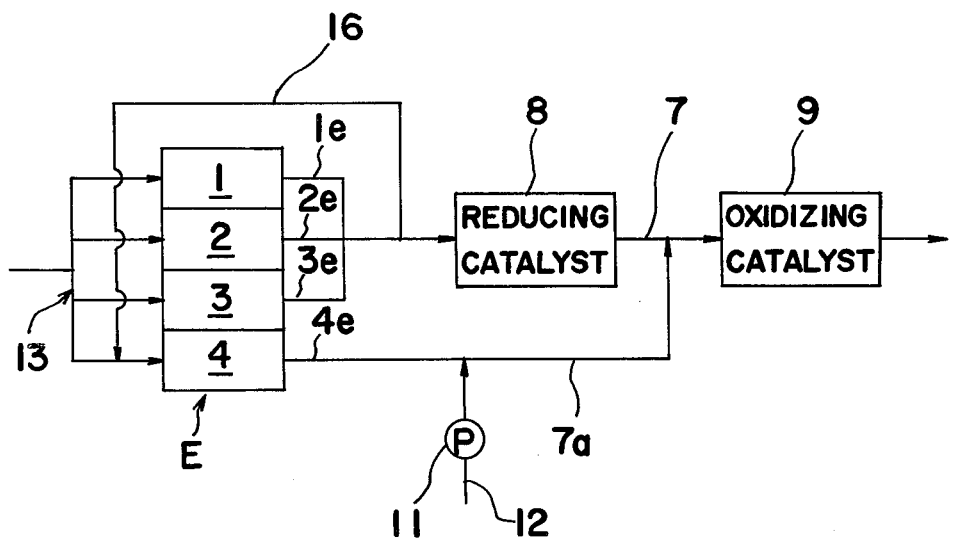
FIG. 3 is a diagram similar to FIG. 2, showing a third embodiment of the present invention.

Referring to FIG. 3, the dual-catalyst purifying apparatus shown is, except for the recirculating passage 16, substantially identical with that shown in FIG. 1. In the embodiment shown in FIG. 3 the exhaust gas recirculating passage 16 has one end connection to a portion of the main exhaust manifold 7 between the junction of all of the exhaust ducts 1e, 2e and 3e of the first group and the reducing catalyst unit 8, and the other end connected to the intake port of the engine cylinder 4e. This exhaust gas recirculating system is well known to those skilled in the art and, therefore, it can readily be understood that the exhaust gases emitted from the engine cylinder 4e contain a less amount of NO$_x$ than that in the case of the embodiment of FIG. 1.

It is to be noted that a similar exhaust gas recirculating system can be equally well employed in the embodiment of FIG. 2.

It is also to be noted that the first mentioned end of the recirculating passage 16, which has been described as being connected to the portion of the main exhaust manifold 7 upstream of the reducing catalyst unit 8, may be connected to any one of the exhaust ducts 1e, 2e and 3e of the first group.

In each of the foregoing embodiments, it has been described that the reducing and oxidizing catalyst units 8 and 9 are, as best shown in FIG. 1, series-connected in the main exhaust manifold 7 in spaced relation to each other. However, in practice, these catalyst units 8 and 9 may be disposed at the junction between the main and auxiliary exhaust manifolds 7 and 7a in a manner such as shown in FIG. 4.

Figure 4:
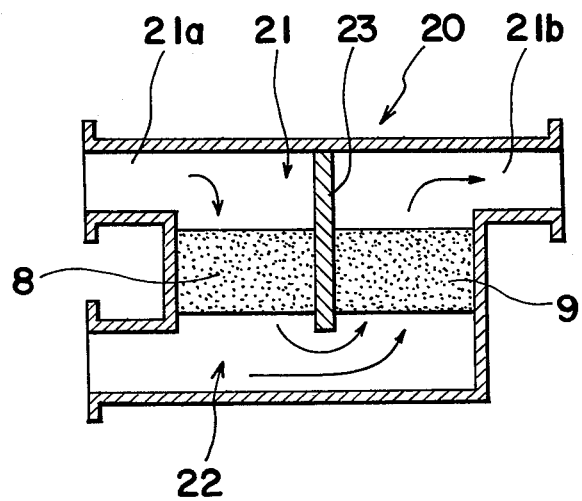
FIG. 4 is a schematic longitudinal sectional view of a portion of an exhaust system, showing a manner in which reducing and oxidizing catalyst units are conveniently disposed in the exhaust system according to the teachings of the present invention.

Referring to FIG. 4, there is shown a mounting structure 20 in the form of a substantially Y-shaped duct which comprises a straight portion 21 and a bent portion 22 connected to the straight portion 21. The straight portion 21 is divided into two parts 21a and 21b by a partition wall 23 extending substantially at right angles to the longitudinal axis of the straight portions 21 into the bent portions 22 and terminating at a position spaced a predetermined distance from the wall of the bent portion 22. The reducing and oxidizing catalyst units 8 and 9 are accommodated within the bent portion 22 and on respective sides of the partition wall 23 so that the exhaust gases entering the portion 21a can flow into the portion 21b first through the reducing catalyst unit 8 after having been deflected by the partition wall 23, and then through the oxidizing catalyst 9 after having admixed with the exhaust gases flowing through the bent portion 22 in a manner as shown by the arrows.

When the mounting structure 20 of the above described construction is to be applied to the system shown in any one of FIGS. 1, 2 and 3, it will be understood that the straight portion 21 and the bent bore 22 correspond respectively to the main and auxiliary exhaust manifolds 7 and 7a. The employment of the mounting structure 20 shown in FIG. 4 is, it is clear, convenient and economical in the manufacture of the dual-catalyst purifying apparatus according to the present invention.

Although the present invention has been fully described in connection with the preferred embodiments thereof with reference to the accompanying drawings, it is to be noted that various changes and modifications will be apparent to those skilled in the art. Such changes and modifications are to be understood being included within the true scope of the present invention unless they depart therefrom.

We claim:

1. An exhaust gas purifying apparatus for use in an automotive vehicle engine of a type having a plurality of engine cylinders each having intake and outlet port means connected to a combustion chamber within the corresponding engine cylinder, the outlet port means of the respective engine cylinders exhausting exhaust gases to the outside of the engine subsequent to combustion of air-fuel mixtures which have been introduced into the associated combustion chambers of the engine cylinders, said exhaust gas purifying apparatus comprising:

a main exhaust passage means having a reducing catalyst therein and having an oxidizing catalyst therein downstream at the reducing catalyst;

an auxiliary exhaust passage means connected to the main exhaust passage means only between the reducing catalyst and the oxidizing catalyst;

said outlet port means being divided into first and second groups, the outlet port means of the first group being connected to said main exhaust passage means and the outlet port means of the second group being connected to said auxiliary exhaust passage means, the number of said outlet port means of the first group being greater than half the total number of the engine cylinders;

a secondary air supply passage means having one end connected to said auxiliary exhaust passage means and the other end being in open communication with a source of secondary air;

a pressure operated valve disposed in said secondary air supply passage means for controlling the supply of secondary air by opening in response to the pulsating flow of the exhaust gases flowing through said auxiliary exhaust passage means.

2. An apparatus as claimed in claim 1, wherein said pressure operated valve is a reed valve.

3. An apparatus as claimed in claim 2, wherein the number of the engine cylinders is four and the number of the outlet port means of the second group is one.

4. An apparatus as claimed in claim 2, wherein the number of the engine cylinder is six and the number of the outlet port means of the second group is two.

5. An apparatus as claimed in claim 2, further comprising an exhaust gas recirculating passage having one end connected to the main exhaust passage means at the upstream side of the reducing catalyst and the other end connected only to the intake port means of some of the engine cylinders having the second group of the outlet port means.

6. An apparatus as claimed in claim 2, wherein the main exhaust passage means is constituted by a plurality of exhaust ducts connected at one end to the outlet port means of the first group and a main exhaust manifold having one end connected to the opposite ends of said respective exhaust ducts, said main exhaust manifold having said reducing and oxidizing catalysts disposed therein, and further comprising an exhaust gas recirculating passage having one end connected to one of said exhaust ducts and the other end connected only to the intake port means of at least some of the engine cylinders having the second group of the outlet port means.

7. An apparatus as claimed in claim 1, wherein said main exhaust passage means has a portion therein projecting transversely of said main exhaust passage means and extending into said auxiliary exhaust passage means at the junction between said main exhaust passage means and said auxiliary exhaust passage means for dividing said auxiliary exhaust passage means into first and second chambers, said reducing and oxidizing catalysts being located on opposite sides of said partition wall and filling said chambers for causing the exhaust gases from the outlet port means of the first group to flow through both the reducing catalyst after having been deflected by said partition wall and then through the oxidizing catalyst after having admixed with the exhaust gases from the outlet port means of the second group.

* * * * *